US006301775B1

United States Patent
Piazza

(10) Patent No.: US 6,301,775 B1
(45) Date of Patent: *Oct. 16, 2001

(54) ALUMINA ENCAPSULATED STRAIN GAGE, NOT MECHANICALLY ATTACHED TO THE SUBSTRATE, USED TO TEMPERATURE COMPENSATE AN ACTIVE HIGH TEMPERATURE GAGE IN A HALF-BRIDGE CONFIGURATION

(75) Inventor: Anthony Piazza, Palmdale, CA (US)

(73) Assignee: The United States of America as represented by the Administrator of the National Aeronautics and Space Administration, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,622

(22) Filed: Dec. 17, 1998

(51) Int. Cl.[7] .............................. H01C 17/10; G01L 1/22
(52) U.S. Cl. ..................... 29/621.1; 29/423; 29/527.2; 156/247; 156/344; 427/453; 338/3; 73/766; 73/767; 73/776
(58) Field of Search .................. 29/423, 527.2, 29/527.4, 621.1; 156/247, 279, 280, 306.3, 344; 427/446, 447, 448, 449, 450, 451, 452, 453, 454, 455, 456, 457; 338/3, 5; 73/766, 767, 774, 775, 776

(56) References Cited

U.S. PATENT DOCUMENTS

| | | | |
|---|---|---|---|
| 3,278,881 | * 10/1966 | Anderson et al. | 29/621.1 |
| 3,314,033 | * 4/1967 | Wnuk, Jr. | 29/621.1 |
| 3,371,516 | * 3/1968 | Russell | 29/621.1 |
| 3,631,835 | * 1/1972 | Hamontre . | |
| 4,104,605 | * 8/1978 | Boundreaux et al. | 338/5 |
| 5,045,365 | * 9/1991 | Okano et al. . | |
| 5,192,938 | * 3/1993 | Ort | 338/3 |
| 5,375,474 | * 12/1994 | Moore, Sr. | 29/621.1 |
| 5,404,124 | * 4/1995 | Ruppin et al. | 338/5 |

FOREIGN PATENT DOCUMENTS

| | | | |
|---|---|---|---|
| 314541 | * 5/1989 | (EP) | 29/621.1 |
| 62-266402 | * 11/1987 | (JP) | 73/766 |
| 04038402 | * 2/1992 | (JP) | 29/621.1 |
| 167662 | * 1/1965 | (SU) | 29/621.1 |
| 586319 | * 12/1977 | (SU) | 29/621.1 |
| 636473 | * 12/1978 | (SU) | 298/621.1 |

* cited by examiner

Primary Examiner—S. Thomas Hughes
Assistant Examiner—Eric Compton
(74) Attorney, Agent, or Firm—John H. Kusmiss

(57) ABSTRACT

A temperature compensation element for a high-temperature strain gage and the method of fabricating the same. Preferably, the element is a "dummy" strain gage not mechanically attached to the substrate. The element is encapsulated in an insulative material and used to compensate an active high-temperature strain gage and wired in a half-bridge configuration. The temperature compensation element and high-temperature strain gage are fabricated using the method of the present invention. This method includes temporarily adhering the element to a heat sink, encapsulated in an insulative material and then removed from the heat sink. Next, the element is either stacked or placed near the active gage. Ideally, the element and the active gage have substantially similar heat transfer and electrical properties.

34 Claims, 2 Drawing Sheets

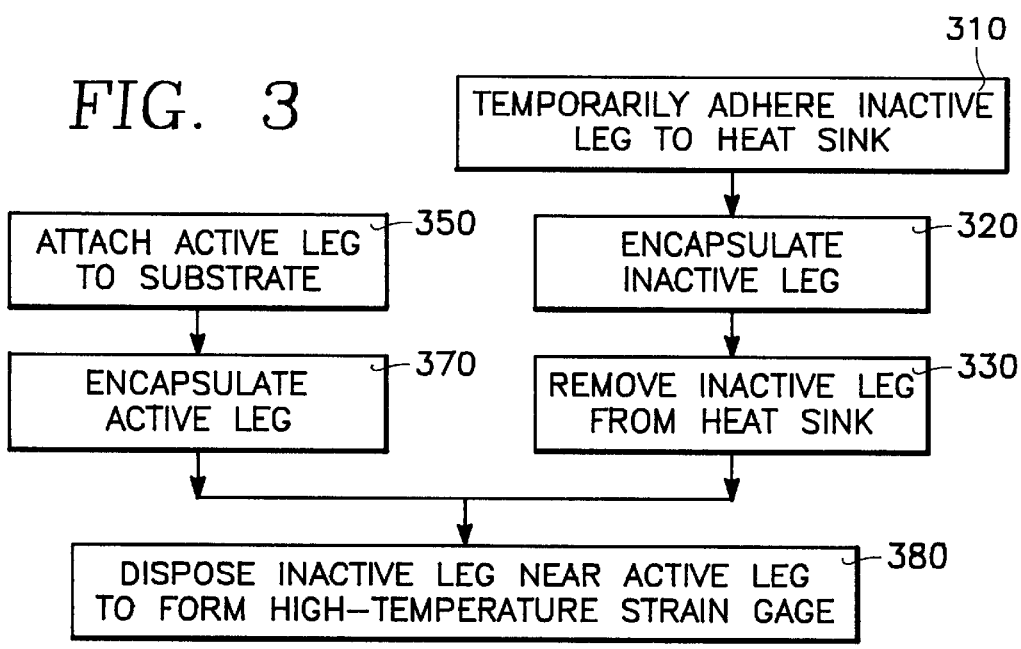
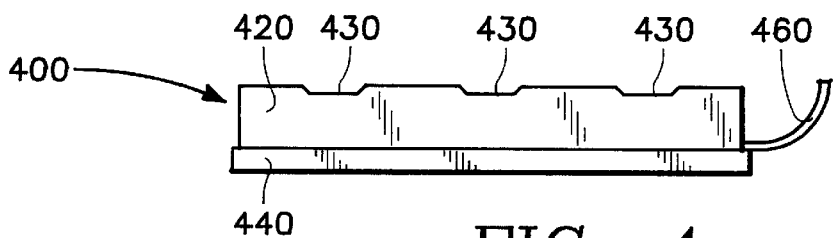
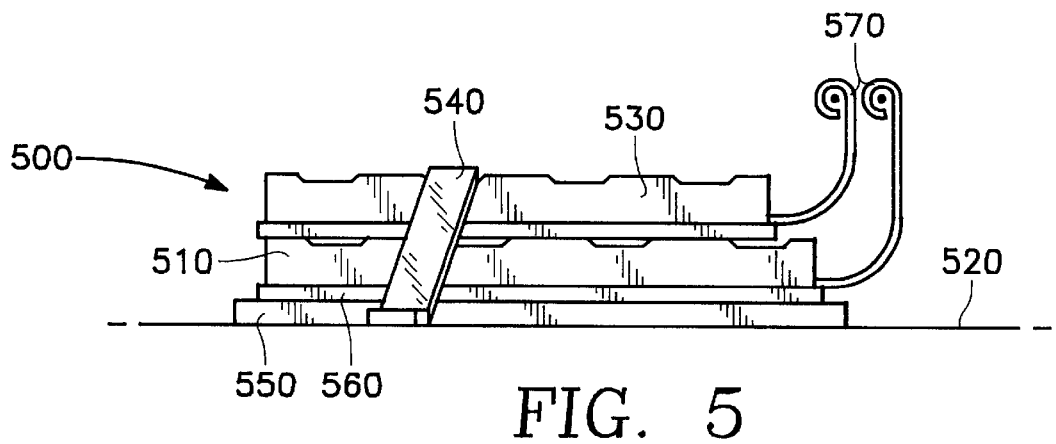

ALUMINA ENCAPSULATED STRAIN GAGE, NOT MECHANICALLY ATTACHED TO THE SUBSTRATE, USED TO TEMPERATURE COMPENSATE AN ACTIVE HIGH TEMPERATURE GAGE IN A HALF-BRIDGE CONFIGURATION

ORIGIN OF THE INVENTION

The invention described herein was made in the performance of work under a NASA contract, and is subject to the provisions of Public Law 96-517 (35 U.S.C. §202) in which the Contractor has elected not to retain title.

BACKGROUND OF THE INVENTION

1. Field of the Invention

The present invention relates in general to high-temperature strain gages and more particularly to a temperature compensation element that includes a strain gage encapsulated in an insulative material and used to temperature compensate an active high-temperature strain gage in a half-bridge configuration. Further, the present invention relates to a method for fabricating this temperature compensation element and a high-temperature strain gage that utilizes this element

2. Background Art

All materials deform to some extent when subjected to external loads or forces. These deformations result in relative displacements that may be normalized as percentage displacement, or strain. Strain is the deformation of a material under the action of applied forces. In more precise terms, strain is the elongation of an object in some direction per unit undistorted length in some direction.

Accurately measuring the strain of a material or object is critical in a multitude of applications. Some examples of high-temperature applications where accurate strain measurement is critical are automotive engine and exhaust system testing, aircraft engine testing and nuclear reactor testing. Moreover, accurate strain measurement permits evaluation of new materials and composites so that automobile manufacturers can select a strong enough material to protect the occupants of an automobile during a collision. In addition, new materials and composites can be evaluated for use as structural members of a commercial aircraft to permit use of a material that is light enough to enable flight but strong enough to remain intact during turbulence and hard landings.

Strain may be measure in several ways. One common way is a resistive wire strain gage. The theory behind the strain gage is that when a length of wire is mechanically stretched, a longer length of a smaller sectioned conductor results, and thus the electrical resistance changes. In other words, as the wire is mechanically elongated, the electrical resistance changes. This change in resistance may be calibrated in terms of strain.

This change in resistance, however, is normally too small for ordinary resistance-measuring devices to detect. Consequently, a circuit arrangement is needed so that the minute changes in resistance may be detected. One useful circuit arrangement is a resistance bridge arrangement, which is well known in the art, and has the added advantage that it provides a means for effectively reducing or eliminating the effect of temperature on resistance.

Ideally, a strain gage would respond only to the applied strain in the part, and be unaffected by other variable in the environment. However, this is not the case, and the electrical resistance of the strain gage also varies with temperature. Moreover, the relationship between strain and resistance change varies with temperature. Especially in high-temperature applications, these deviations cause by temperature can lead to substantial error in the measured strain.

When the temperature of the strain gage changes, a subsequent change is produced in the resistance of the gage. This temperature-induced resistance change is independent of, and unrelated to, the mechanical strain that is being measured in the substrate to which the gage is attached. This resistance change is called the apparent strain, or, because it is temperature induced, the thermal output of the gage. Typically, for convenience in correcting measurement strain data, the thermal output is expressed in strain units.

Temperature compensation, therefore, is important for resistive wire strain gages to reduce the error from thermal output. Ideally, temperature compensation of a high-temperature strain gage is achieved by subtracting the thermal output from the measured strain. Typically, this is done by wiring the strain gage in a Wheatstone bridge with an active leg and an inactive leg.

In theory, the error due to thermal output can be completely eliminated by employing a half-bridge configuration that incorporates an active gage in conjunction with an inactive compensating gage. These two gage elements are then wired to form adjacent arms of a Wheatstone bridge circuit. The active gage is mounted on the substrate to "feel" the strain of the substrate, while the inactive or "dummy" gage is merely left unattached to the substrate. "Unattached" means that the gage is positioned such that the gage does not feel the strain of the substrate when the substrate is subject to strain. Both the active and inactive gages must be nearly identical and positioned such that they will both experience identical temperature changes.

Under these ideal circumstances, the thermal outputs of the two gages should be identical. And, since identical resistance changes in adjacent arms of the Wheatstone bridge do not unbalance the circuit, the thermal outputs of the active and the inactive gages should cancel exactly. Thus, when both gages are subjected to a change in temperature, the circuit remains nulled. Conversely, when the substrate is mechanically strained only the active gage responds and registers only the measured strain.

In practice, however, this method of temperature compensation is subject to errors. The principal problems encountered by this method are those of establishing and maintaining the identical conditions needed. For example, there is difficulty in ensuring that the temperature of the active and the inactive gages are always identical. Moreover, strain gages, even if from the same lot or package, are never precisely identical. Even though the differences between the gages may be negligible at room temperature, the differences may become evident and significant when used in high-temperature applications.

Several variations on the above method of temperature compensating high-temperature strain gages currently exist. One method, developed at NASA Lewis Research Center, is to use external electrical biasing of the strain gage signal in combination with a bonded inactive compensation element.

The problem, however, with this method is that it is quite expensive because costly external circuitry, including precision pots and resistors, must be used. In addition, both the signal conditioning and the data acquisition procedures are much more complex with this method. Another problem is that to optimize the strain measurements this method requires calibration. Thus, a calibration run must be made before any strain measurements can be made. This first cycle calibration severely limits the use of this method, because nearly all real world applications require first cycle strain measurements.

Another method is a remote dummy concept, whereby the inactive temperature compensation element is controlled by an oven in a remote location. The inactive gage is placed on a similar but separate piece of substrate as the active gage. The inactive gage is placed in an oven to compensate for the thermal output.

The problem with this method, however, is that the oven adds great expense to the system because expensive temperature controllers and portable mini-ovens are required. Moreover, the system is quite cumbersome to move from location to location. In addition, this method further complicates the temperature compensation procedure because thermal strains in the compensation substrate must be taken into consideration.

Another compensation method is to use a platinum element in series with a single active strain gage in order to rotate the apparent strain curve. Although this method is fairly inexpensive and simple, it is also quite inaccurate because a significant portion of the apparent strain output is not compensated. Consequently the overall thermal output compensation provided by this method is very ineffective.

A recent method developed at NASA Langley Research Center involves housing an active flame-sprayed gage and a bare inactive temperature compensation element within a ceramic enclosure. The problems with this method, however, are that it requires special gages and that its usable temperature range is quite narrow. In addition, because a ceramic housing must be built around the active and the inactive gages, the method involves a tedious and an extensive installation process. Furthermore, care must be taken when spraying down the active gage to keep the inactive gage covered.

Another problem with the Langley method concerns the apparent strain (thermal output) curve. An apparent strain curve is a graph of the thermal output of the gage versus the temperature. The slope of the apparent strain curve will shift with temperature because the curve is a function of temperature. For most materials, the slope of the apparent strain curve will become more positive as the temperature increases. Moreover, this change in slope as a function of temperature is generally non-linear. Therefore, it is usually quite difficult to compensate for the thermal output when the temperature is changing any appreciable amount.

FIG. 1 illustrates the apparent strain curves of the Langley high-temperature strain gage discussed above. Plot 130 is the two-gage average apparent strain curve of the Langley gage after a maximum test temperature of 1200 degrees F. has been attained. Plot 140 and Plot 150 are the two-gage average after maximum test temperatures of 1500 degrees and 1700 degrees has been attained, respectively. As such, each time the strain gage attains a new maximum temperature, the strain gage traces a different apparent strain curve, such as 130, 140, or 150. It can be seen that the average slope of Plots 130, 140 and 150 are not the same and in fact the average slopes change non-linearly with temperature over the entire temperature range.

Therefore, another disadvantage of the Langley method is that the slope of the apparent strain curve is a function of temperature. This makes it difficult to subtract the thermal output from the measured strain and leads to inaccuracies in the measured strain. These inaccuracies become even more significant if the temperature changes any appreciable amount.

Therefore, what is needed is a method of temperature compensation for a high-temperature strain gage capable of providing viable data in operation at temperatures in excess of 1700 degrees Fahrenheit. In addition, the operation of the strain gage would not be limited by a compensation element or a method that required special gages. Further, the strain gage would be usable over a wide temperature range.

What is further needed is a temperature compensation method for a high-temperature strain gage that is simple and easy to use. In particular, this method would not involve complicated signal conditioning or data acquisition procedures. Furthermore, this compensation method would not require tedious or extensive installation procedures.

What is further needed is a temperature compensation element and method that is effective and accurate over a wide range of high temperatures. The method must easily decouple the temperature component of strain from the measured strain to arrive at the true strain. In order to accomplish this, the method should have an virtually constant apparent strain curve slope that is fairly linear so as to permit easy canceling out of the thermal output from the measured strain.

Whatever the merits of existing and the above-mentioned temperature compensation elements and methods for high-temperature strain gages, they do not achieve the benefits of the present invention.

SUMMARY OF THE INVENTION

To overcome the limitations in the prior art as described above and other limitations that will become apparent upon reading and understanding the present specification, the present invention includes a temperature compensation element for a high-temperature strain gage incorporating an inactive strain gage encapsulated in an insulative material. Moreover, the present invention includes a method that utilizes this temperature compensation element.

The temperature compensation element and method of the present invention permit simpler and more accurate temperature compensation of high-temperature strain gages. In particular, the present invention has an apparent strain curve slope that is a virtual constant and is not a function of temperature. Because of this, the thermal output can be easily eliminated from the measured strain over a wide range of temperatures. Thus, the temperature compensation element and method of the present invention is more accurate and simpler to use than existing methods and devices.

In a preferred embodiment, the invention includes a temperature compensation element encapsulated in an insulative material. Preferably, the element is a strain gage that is not mechanically attached to the substrate to be measured and therefore does not feel any strain. Moreover, in a preferred embodiment, the element is the inactive gage in a half-bridge configuration that includes an active gage encapsulated in an insulative material. Both the active and the inactive gages are encapsulated in the same insulative material and both gages have substantially similar heat transfer and electrical properties.

This insulative material may be aluminum oxide or any other suitable material for high-temperature insulation. Moreover, the insulative material may be applied as a base coat under the inactive gage to further insulate the gage. Preferably, the base coat is approximately 0.004 inches thick.

In a preferred embodiment, this temperature compensation element is included in a high-temperature strain gage in a half-bridge configuration. This strain gage includes an active gage, attached to the substrate to be measured, and an inactive gage used for temperature compensation that is not attached to the substrate. Both gages are encapsulated in an insulative material that may be aluminum oxide.

Preferably, the unattached inactive element may be located in contact with the substrate and adjacent the active gage. Alternatively, the inactive gage may be placed in contact and on top of the active gage to form a stacked configuration. This stacked configuration is then strapped to the substrate.

The foregoing temperature compensation element is fabricated using the methods of the present invention. The temperature compensation element may be fabricated by first temporarily adhering the element to a heat sink. Then the element is encapsulated in an insulative material. Next, the element is carefully removed from the heat sink and is ready for use in a high-temperature strain gage installation.

The element is preferably a strain gage. Moreover, the preferred way to temporarily attached the element to the heat sink is to use aluminum tape. The tape is then roughened, either by grit blasting or some other method, and then the element is attached to the tape. Other embodiments include first applying a base coat of the insulative material to the tape and applying the element over the tape.

The high-temperature strain gage in a half-bridge configuration with an active gage and an inactive element is fabricated by encapsulating the active gage in a first insulative material. The encapsulated active gage is then attached to the substrate to be measured. Meanwhile, the compensation element is separately prepared by temporarily adhering the element to a heat sink. The element is encapsulated in a second insulative material and then removed from the heat sink. Next, the element is placed near the active gage so that they both experience the same temperature variations. The element is not mechanically attached to the substrate and does not experience any strain.

In other embodiments, the element is a strain gage that is substantially similar to the active gage. Moreover, the first and the second insulative materials are preferably the same.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWINGS

Referring now to the drawings in which like reference numbers represent corresponding parts throughout:

FIG. 3 is a flow process diagram showing the method of fabricating the high-temperature strain gage of the present invention.

FIG. 4 is side view of the temperature compensation element fabricated using the method of FIG. 2.

FIG. 5 is a side view of the high-temperature strain gage fabricated using the method of FIG. 3.

DETAILED DESCRIPTION OF THE PREFERRED EMBODIMENT

Figure 1:
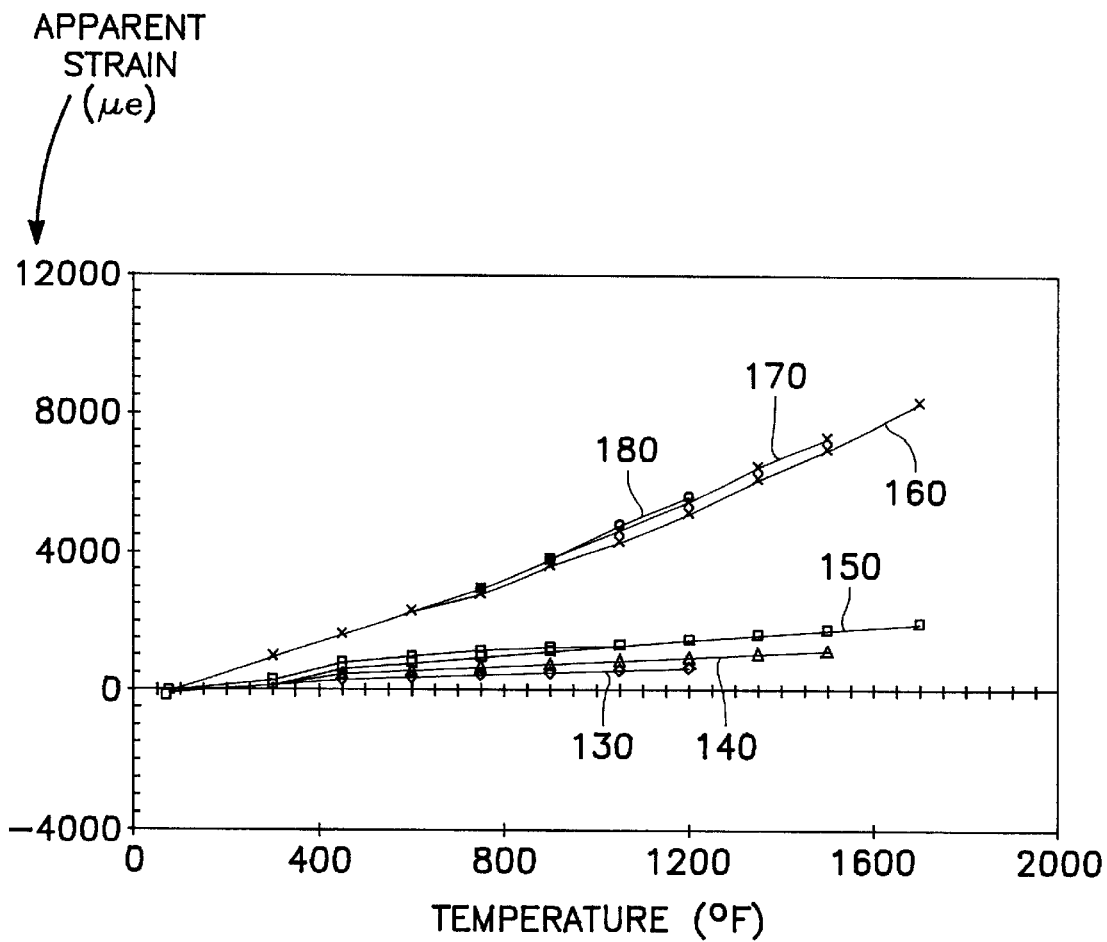
FIG. 1 is a graph of the apparent strain vs. temperature illustrating the apparent strain curves of the present invention and a prior art high-temperature strain gage.

In the following detailed description of the preferred embodiment, reference is made to the accompanying drawings in which is shown by way of illustration a specific embodiment whereby the invention may be practiced. It is to be understood that other embodiments may be utilized and structural and functional changes may be made without departing from the scope of the present invention.

I. Introduction

As shown in the drawings for purposes of illustration, the present invention is embodied in a temperature compensation element and method for temperature compensating a high-temperature strain gage. The element includes a strain gage encapsulated in an insulative material and used as the inactive element of a high-temperature strain gage in a half-bridge configuration. Further, the present invention relates to a method for fabricating this temperature curve compensation element and a high-temperature strain gage that utilizes this element.

Existing high-temperature strain gages have an apparent strain curve slope that changes with temperature and is not constant. The present invention has a virtually constant apparent strain slope that simplify the elimination of thermal output from the measured strain.

FIG. 1 illustrates a comparison between a prior art high temperature strain gage and the strain gage of the present invention. As discussed above, Plots 130, 140 and 150 all illustrate the apparent strain curves of the Langley strain gage after maximum temperatures of 1200, 1500 and 1700 degrees F. respectively have been attained. Plots 180, 170 and 160 represent the apparent strain curves of the element of the present invention at these same temperatures, respectively. Namely, Plot 180 is the apparent strain curve of the invention at a test temperature of 1200 degrees F. Likewise, Plots 170 and 160 are the apparent strain curves of the invention at test temperatures of 1500 and 1700 degrees F. respectively.

In FIG. 1, the comparison between the two gages shows that the apparent strain curve slope of the Langley gage varies as a function of temperature. Thus, the slope of Plot 130 is different from the average slope of Plots 140 and 150 over the entire temperature range. Moreover, the change in slope is nonlinear. Accordingly, the difference between the average slope of Plot 130 and the average slope of Plot 140, as the maximum temperature is increased 300 degrees F. from 1200 degrees F. to 1500 degrees F. is much less that the change in slope between Plots 140 and 150, as the maximum temperature is increased 200 degrees F. as evidenced by the greater spacing between plots 140 and 150. This nonlinear variation in the average slope each time different maximum temperature is attained makes it difficult to account for thermal output, especially when the temperature is changing over a wide range, such as in a hypersonic flight environment.

FIG. 1 also illustrates that the apparent strain curve slope corresponding to the strain gage of the present invention is virtually constant over the range of 1200 to 1700 degrees F. In fact, there is little variation between the slopes of Plots 160, 170 and 180. Because the apparent strain curve slope is virtually constant, the thermal output can be eliminated from the measured strain much easier over a wide range of test temperatures.

II. Method of the Invention

Figure 2:
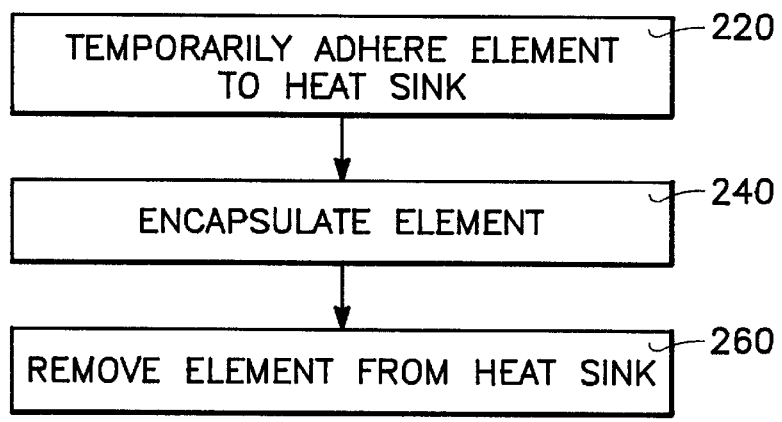
FIG. 2 is a flow process diagram showing the method of fabricating the temperature compensation element of the invention.

FIG. 2 is a flow process diagram showing the method of fabricating the temperature compensation element of the invention. This temperature compensation element is preferably used as the inactive element of a high-temperature strain gage also having an active gage and configured in a half-bridge. In a preferred embodiment, the temperature compensation element is a strain gage, preferably the same type as the active gage.

As shown in FIG. 2, the process 220 of the method is to temporarily adhere the element to a heat sink. Preferably, this involves adhering a piece of tape to the heat sink. The heat sink may be a metal heat sink, preferably a steel plate 5"×5"×0.2" in size.

It has been found that aluminum tape works best for process 220. Specifically, later in the method an insulative material is sprayed on at about 300 degrees F. If you do this to the metal heat sink it attaches well, but the element cannot be removed from the heat sink without destroying the element. What was needed was a surface that was strong enough to withstand the temperature of applying the insulative material yet permitting removal without the destruction of the element. Aluminum tape serves this purpose well. The tape serves as the temporary substrate to which the element may be attached. Then, after encapsulation, the element may be removed intact.

The preferred type of aluminum tape is manufactured by Lamart Corp. Clinton, N.J., as #213-2" or an equivalent. The tape is cut into a 4 inch long and 2 inch wide piece and adhered to the metal heat sink.

Next, the temperature compensation element installation area is masked. One brand of tape that works well for masking is A2008 Teflon impregnated tape manufactured by CHR Industries of New Haven, CT. The size of the area to be masked depends on the size of the element being used. If the element is a strain gage, a typical area to be masked is 0.7 inches by 0.5 inches.

The aluminum tape masked area is then grit blasted using −30 to +200 brown fused alumina oxide. Typically, a quick pass using 40 pounds per square inch of pressure is used to lightly but evenly roughen the aluminum tape. Approximately 40 percent coverage is usually adequate.

It should be noted that several attempts may be required when attempting this procedure for the first time. If the grit blasting is too light the alumina may detach if a base coat is applied or during the gage installation to the base coat. On the other hand, if the grit blasting was too strong or heavy the aluminum tape may fail during the Rokide flame spray process due to heat and the excessive removal of aluminum from the tape.

The Teflon tape that masked the installation area is then removed. The area is then blasted with filtered air, at a pressure of greater than 60 pounds per square inch, and wiped clean with clean gauze and a light amount of isopropyl alcohol.

Next, a base coat is preferably applied to the installation area to which the temperature compensation element may be attached. The base coat is fabricated by measuring the thickness of the installation area. For example, this may be done by using a micrometer. A 0.004 inch thick coating of insulative material is applied as a base coat. Preferably, this material is aluminum oxide.

This base coat is applied using a Rokide flame spray process, and initial spraying should be slight further away than normal procedures. Start at a spraying distance of 12 inches from the installation area until the aluminum tape is barely covered, and then move in closer to a normal spraying distance of approximately 8 inches from the installation area.

During the application of the base coat, it is highly recommended that a lower surface temperature be maintained during the flame spray process. This may be achieved by using an Exair Cold Gun, or an equivalent, from behind the heat sink or steel plate. This is quite important, as overheating during the flame spray process will cause adhesive failure of the aluminum tape and subsequent cracking and failure of the alumina base coat.

Next, process 220 involves wiping off any alumina residue that may remain on the Teflon tape using clean gauze. Then, with the tape masking still in place, adhere the carrier tape of the element to the 0.004 inch thick alumina base coat. All surrounding areas of the element are then masked off, preferably using the A2008 Teflon tape.

Referring again to FIG. 2, process 240 involves the encapsulation of the element. Generally, the entire element is encapsulated in an insulative material that is preferably aluminum oxide. More specifically, a tack coat is applied to the element by using the aforementioned Rokide flame spraying process through the windows of the carrier tape. A minimum thickness of alumina should be applied. In general, the tack coat is the proper thickness when gage filaments are slightly visible through the tack coating.

Next, all the Teflon tape masking the installation area is removed. Moreover, the carrier tape is removed, which should be peeled back over itself at a sharp 45 degree angle. Using a microscope, any silicon adhesive that may remain should be removed. Furthermore, any peaks or bridging of the alumina that may result in strain concentrations should be chipped away.

The gage area is then remasked using the Teflon tape leaving the entire gage area is exposed. The final insulative coat is applied using the Rokide flame spray process. This final insulative coat should be sufficient to just encapsulate the gage wires, but no thicker. The tape masking is then removed from around the element and all sharp edges and corners of the alumina are knocked down using an alumina stone.

The element is then removed from the heat sink. This is done by carefully removing the encapsulated element from the aluminum tape. As stated above, it is a discovery of the invention that aluminum tape works best for keeping the element securely fastened to the heat sink during the encapsulation process and yet still permits the easy removal of the element after fabrication. The element is best removed by using a spade type Exacto blade to gently pry the element from the aluminum tape. It is important to avoid any cracking of the alumina when removing the element from the heat sink.

The temperature compensation element fabricated by the above process is for use in a high-temperature strain gage where the element is the inactive leg. The present invention also includes a method of fabricating this high-temperature strain gage having an inactive and an active leg. The gage is disposed on a substrate and is used to measure the strain on the substrate.

FIG. 3 is a flow process diagram showing the method of fabricating the high-temperature strain gage. Processes 310, 320 and 330 are generally the same processes as shown in FIG. 2. Together, these processes fabricate the inactive temperature compensation element leg of the high-temperature strain gage as described above.

Meanwhile, the active leg of the high-temperature strain gage is attached to a substrate as shown in process 350. Preferably, process 350 uses a standard plasma (NiCr/alumina) base coat and gradient layer procedures to attach the active leg. Next, during process 370 the active leg is encapsulated. This encapsulation is ideally performed using the same insulating materials as was used to encapsulated the temperature compensation element in process 240. However, other insulating methods may be used. The important consideration is that both processes 240 and 350 use nearly identical insulative materials and procedures so that the same insulative conditions exist at the active gage and the inactive gage.

In process 380 the inactive leg is disposed near the active leg. The two legs are then wired so that they form a high-temperature strain gage. There are generally two ways in which the two legs may be disposed near each other. First, the two legs may be stacked with the inactive leg sitting on top of the active leg. This stacked configuration may be secured by spot welding a nichrome strap across the two legs. Ideally, the heat transfer between the two legs in a this configuration would be sufficient to introduce only minimal errors due to the temperature difference between the legs as the temperature changes. The advantage of this configuration is that the installation area needed is only the size of one leg.

Alternatively, the two legs may be disposed near one another by placing the unattached inactive leg next to the attached active leg. This configuration places the inactive leg in direct contact with the substrate. Therefore, at least theoretically, both legs respond identically to changes temperatures, thus increasing accuracy. The disadvantage of this configuration is that the installation area is increased over the stacked configuration.

III. Structure of the Invention

The method of the present invention produces a temperature compensation element that is generally used as the inactive leg of a high temperature strain gage. FIG. 4 is a side view of the temperature compensation element 400 fabricated using the method of FIG. 3.

The temperature compensation element 400 includes a base coat 440, preferably a 3 micron thick Rokide base coat. The body of the element 420 is encapsulated in an insulative material. The valleys 430 on top of the element 400 are caused by the tape needed to hold the strain gage together when first applying the insulative coating. The lead tabs 460 are wired to the strain gage as discussed above.

FIG. 5 is a side view of the high-temperature strain gage 500 fabricated using the method of FIG. 3. In this stacked configuration, the active strain gage 510 is attached to the substrate 520 while the inactive gage 530 remains unattached. A NiCr strap 540 keeps the temperature compensation element 530 on top of the active gage 510. A plasma NiCr base coat 550 is attached to the substrate 520 while over the NiCr base coat 550 is attached the active gage Rokide base coat 560. The lead wires 570 are wired in preferably in a half-bridge configuration.

IV. Working Example

This working example evaluated the apparent strain ($E_{app}$) data for two strain gages fabricated according to the method of the present invention. Each gage consist of a standard active leg high temperature strain gage and a free unattached Rokided gage wired in a half bridge configuration. In this working example, the temperature compensation element is a strain gage.

a. Coupon Layout

One Inconel sheath, 28 AWG, K-type thermocouple and two half-bridge strain gages were installed on an Inconel 601 coupon (2"×4"×0.063"). The identification code assigned to this test coupon was DLC1 (Development Lab Coupon 1).

b. Strain Gage Configuration

Four high temperature strain gages were installed in two half-bridge configurations. Each half-bridge consisted of an active leg (R1) and an inactive temperature compensation leg (R2). The active leg was attached using standard plasma (NiCr/alumina) base coat and gradient layer procedures. A 0.002" diameter 120Ω BCL strain gage was then flame sprayed on top of a Rokide insulating layer (0.00411"). The inactive leg consists of a Rokide 10 encapsulated 0.002" diameter 120Ω BCL gage that is not attached to a substrate. The two installations were ground flat using an alumina stone to increase surface contact and placed in a stacked configuration. The stacked configuration was secured by spot welding a Nichrome strap across the gages, as illustrated in FIG. 5. The two gages were then wired in a half-bridge.

c. Apparent Strain Testing

Testing of Coupon DLC1 was performed in the radiant 20 oven using a direct radiation shield (susceptor). All $E_{app}$ testing was performed at a heating and cooling rate of one degree Fahrenheit per second. Test temperatures included 1200, 1500, and 1700° F. respectively. Three cycles to each test temperature were performed. Tests were performed 26 statically using five minute holds. Hold temperatures for static tests were 300, 450, 600, 750, 900, 1050, 1200, 1350, 1500, and 1700° F.

d. Placement of Temperature Compensation Gage

The physical location of the compensation element was one issue where only one of two options would be evaluated. Option one consisted of strapping down the unattached compensation gage next to the active gage. This method seats the temperature compensation gage in direct contact with the substrate and at the same level as the active gage, theoretically improving the temperature difference that will exist between the two quarter-bridges in transient conditions. Unfortunately, the installation area would increase considerably.

Option two, which was chosen for this test, is the stacked configuration mentioned previously. Ideally, the heat transfer between two gages in a stacked configuration would be sufficient to introduce only small errors due to the temperature difference between the gages during transients. With this second option, the installation area is restricted to the size of a 120Ω standard single active BCL gage.

A direct comparison with NASA GWP-29 data was desired, therefore the heating/cooling rate for this experiment was confined to 1° F. per second. Since the heating rate was relatively slow, the stacked approach was utilized for this experiment.

e. Unattached Rokide Element

The temperature compensation element, or unattached gage, was fabricated according to the method of the present invention as shown in FIG. 2. Using this process, the unattached gage whereby a Rokide base coat and a subsequent gage installation can be flame sprayed to a surface then separated intact from that surface. This primarily involved experimentation with different substrate materials and surface preparations.

f. Apparent Strain Output

The $E_{app}$ output of BCL wire, when configured in a single active quarter-bridge, is primarily the resistance change of the alloy due to temperature (Thermal Coefficient of Resistivity or TCR). The output caused by the expansion mismatch between the substrate and the active gage, for laboratory testing on Inconel specimens, is minimal. The Coefficient of Thermal Expansion (CTE) values for BCL alloy and Inconel 601 are very similar and essentially cancel in the $E_{app}$ formula below.

$$E_{app}=[\beta_G/GF_S+(\alpha_S-\alpha_G)](\Delta T)=\Delta R/R_{IN}(GF_S)$$

Where: $E_{app}=E_{app}$ output, $\mu e$ $\beta_G$=the TCR of the gage alloy $GF_S$=Gage Factor Set (Measurements Group System 4000 input)

$\alpha_S$=the CTE of the substrate (specimen)

$\alpha_G$=the CTE of the gage alloy $\Delta T$=maximum test temperature minus room temperature $\Delta R$=gage resistance at maximum test temperature minus initial room temperature gage resistance $R_{IN}$=initial room temperature gage resistance Investigation into half-bridge configurations, when using high temperature alloys, has increased recently. This is primarily due to the fact that some traits of the alloy are difficult to quantify and alter. These characteristics include non-linear cycle-to-cycle rotating $E_{app}$ curves, zero shifts as a function of maximum test temperature and cooling rate, the Phase Transformation Zone, and drift. Theoretically, most of these problems cancel when using a half-bridge if the active and compensation legs are under the same conditions (like changes in adjacent arms of a Wheatstone Bridge cancel). Temperature conditions may be the most difficult hurdle to overcome in terms of heat transfer to both legs at high heating rates.

The $E_{app}$ curves generated from the half-bridge configuration used in this experiment (Coupon DLC1), though fairly linear were of large magnitude. In a half-bridge configuration the TCR essentially cancels. The high positive half-bridge output is due to the more negative output of the unattached Rokided gage (R2) as compared to the active standard gage (R1). The high negative output of the compensation element (R2) is a result of the significant CTE mismatch between the gage alloy and the low expansion ceramic Rokide encapsulation. This mismatch restricts the expansion of the wire and applies a compressive load on the gage. Even though the active gage is also encapsulated in Rokide, the substrate is the dominating factor in terms of CTE.

Since the gages were not recorded as quarter-bridges, some calculations were performed to verify that the high positive output was caused by the CTE mismatch of the compensation leg, and that no other major anomaly was taking place. Since the slope was constant throughout the test temperature ranges only one verification point was required. Third cycle data to 1700° F. was used to perform the calculation below. The $E_{app}$ data used had not been corrected for GF at temperature. Refer to the $E_{app}$ formula above.

$E_{app}$Active Gage $(R_1)=[-21.9\times10^{-6}/2.0+(9.50\times10^{-6}-8.37\times10^{-6})]$
1625=−15,957 $\mu e$ $E_{app}$ Compensation $(R_2)=[-21.9\times10^{-6}/2.0+(4.75\times10^{-6}-8.37\times10^{-6})]$
1625=−23,676 $\mu e$ Calculated $E_{app}$ half-bridge output @1700° F.=$R_1-R_2$=−15,964−(−23,683)=7719 $\mu e$ Measured $E_{app}$ half-bridge output @1700° F. (Measurements Group SY4000)=8050 $\mu e$ (4% difference)

g. Zero Shifts

A positive characteristic of this gage configuration was that a relatively small non-zero return, or zero shift, occurred during the initial first cycle. The zero shift for cycle two to 1200° F. was essentially zero. Further $E_{app}$ testing to 1500° F. and 1700° F. revealed larger zero shifts on the first cycle to that test temperature. First cycle data to 1500° F. indicates that the zero shift may be due to an unexplained positive drift, or change, which occurred during the five minute hold at 1500° F. Conversely, the 1700° F. first cycle data has a negative change when approaching 1700° F. and during the hold period. The first cycle to 1700° F. also increased the scatter between the two gages. Unfortunately neither gage was split into individual quarter-bridges to isolate where, and perhaps why, the changes took place. The change or drift at maximum test temperature did not repeat on the second cycles. In both instances (1500° F. and 1700° F.), second and third cycle zero shifts were basically non-existent and the slope of the curves were not significantly effected.

In past half-bridge gage investigations, zero shifts occurring above 1500° changed the slope of the subsequent cycle. Outside the laboratory, where temperature profiles are not linear and of constant rate, correction of strain gage data is more difficult when the slope of the curve is a function of the maximum test temperature and thermal history.

FIG. 1 is a comparison of $E_{app}$ data on two different half-bridge gage configurations at three test temperatures. This graph shows the curves generated from this working example and the data from a half-bridge configuration developed at Langley Research Center (LaRC) using the Langley high temperature strain gage. Although the slope is greater with the DCL1 test gages it does remain fairly constant throughout the three maximum test temperatures, whereas the Langley half-bridge gage changes slope from cycle to cycle at temperatures of 1500° F. and above.

h. Platinum Compensation

Users of the high temperatures strain gage of the present invention have the option to further compensate the $E_{app}$ output with the use of a Platinum (Pt) element. Platinum has the opposite TCR, positive, as BCL alloy and is fairly linear. By including the correct length of Pt in series with R2 the slope of the output can be rotated down to a more horizontal output. Though the magnitude of the slope would be reduced significantly with this method, the possibility of an increase in gage-to-gage scatter exists. Great care must be taken to insure consistency of the Pt length in order to minimize scatter.

Another form of compensation utilizes the Karl Anderson Current Loop circuit. Rotation of the $E_{app}$ curve can be accomplished electronically with the use of this circuitry. This form of compensation was not tested in this working example.

From the foregoing it will be appreciated that the temperature compensation element and the high temperature strain gage of the present invention and the methods for making the same offer numerous advantages. In particular, the present invention has an apparent strain curve slope that is a virtual constant. Because of this, the thermal output can be easily eliminated from the measured strain over a wide range of temperatures. Thus, the temperature compensation element and method of the present invention is more accurate and simpler to use than existing methods and devices.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of fabricating a high-temperature strain gage, the high-temperature strain gage having an active leg encapsulated in a first insulative material and being disposed on a substrate, the method comprising:

(a) providing a temporary substrate on a heat sink;

(b) temporarily adhering a temperature compensation element to the temporary substrate;

(c) encapsulating the temperature compensation element, including a surface thereof facing the temporary substrate, in a second insulative material;

(d) removing the temperature compensation element from the temporary substrate; and (e) disposing the insulated temperature compensation element near the active leg;

whereby the temperature compensation element is not attached to the substrate and not subject to strain.

2. The invention as set forth in claim 1, wherein temporarily adhering further comprises:

disposing aluminum tape on the heat sink;

temporarily adhering the temperature compensation element to the aluminum tape such that the temperature compensation element can be removed from the aluminum tape without damaging the temperature compensation element.

3. The invention as set forth in claim 2, wherein adhering the temperature compensation element to the aluminum tape further comprises:

masking the heat sink except for the aluminum tape; and, roughening the aluminum tape such that the aluminum tape is lightly and evenly roughened.

4. The invention as set forth in claim 3, wherein roughening further comprises:

grit blasting the aluminum tape.

5. The invention as set forth in claim 1, wherein the first insulative material and the second insulative material are the same.

6. The invention as set forth in claim 5, wherein the first insulative material and the second insulative material are aluminum oxide.

7. The invention as set forth in claim 2, wherein encapsulating further comprises:

disposing a base-coat of the second insulative material onto the aluminum tape.

8. The invention as set forth in claim 7, wherein the base coat is approximately 0.004 inches thick.

9. The invention as set forth in claim 2, wherein removing further comprises:

gently prying the encapsulated temperature compensation element from the aluminum tape.

10. The invention as set forth in claim 1, wherein:

the active leg is a first strain gage; and, the temperature compensation element is a second stain gage;

wherein the first strain gage and the second strain gage have substantially similar heat transfer and electrical properties.

11. The invention as set forth in claim 1, wherein disposing further comprises:

disposing the temperature compensation element generally adjacent the active leg such that the temperature compensation element is in contact with the substrate.

12. The invention as set forth in claim 11, further comprising:

strapping the temperature compensation element to the substrate.

13. The invention as set forth in claim 1, wherein disposing further comprises:

disposing the temperature compensation element over the active leg such that the temperature compensation element is in contact with the active leg and forms a stacked configuration.

14. The invention as set forth in claim 13, further comprising:

strapping the stacked configuration to the substrate.

15. A method of fabricating a high-temperature strain gage having an active leg and an inactive leg, the high-temperature strain gage being disposed on a substrate, the method comprising:

(a) encapsulating the active leg in a first insulative material;

(b) attaching the encapsulated active leg to the substrate;

(c) providing a temporary substrate on a heat sink;

(d) temporarily adhering the inactive leg to the temporary substrate;

(e) encapsulating the inactive leg in a second insulative material;

(f) removing the encapsulated inactive leg from the temporary substrate; and (g) disposing the inactive leg near the active leg such that the inactive leg is not attached to the substrate and is not subject to strain.

16. The invention as set forth in claim 15, wherein temporarily adhering further comprises:

disposing aluminum tape on the heat sink; and, temporarily adhering the inactive leg to the aluminum tape such that the inactive leg can be removed from the aluminum tape.

17. The invention as set forth in claim 16, wherein adhering the inactive leg to the aluminum tape further comprises:

masking the heat sink except for the aluminum tape; and, roughening the aluminum tape such that the aluminum tape is lightly and evenly roughened so as to permit proper adhering of a base coat.

18. The invention as set forth in claim 17, wherein roughening further comprises:

grit blasting the aluminum tape.

19. The invention as set forth in claim 15, wherein the first insulative material and the second insulative material are the same.

20. The invention as set forth in claim 19, wherein the first insulative material and the second insulative material are aluminum oxide.

21. The invention as set forth in claim 16, wherein encapsulating the inactive leg further comprises:

disposing a base coat of the second insulative material onto the aluminum tape.

22. The invention as set forth in claim 21, wherein the base coat is approximately 0.004 inches thick.

23. The invention as set forth in claim 16, wherein removing further comprises:

gently prying the inactive leg from the aluminum tape.

24. The invention as set forth in claim 15, wherein:

the active leg is a first strain gage; and, the inactive leg is a second strain gage;

wherein the first strain gage and the second strain gage have substantially similar properties.

25. The invention as set forth in claim 15, wherein disposing further comprises:

disposing the inactive leg generally adjacent the active leg such that the inactive leg is in contact with the substrate.

26. The invention as set forth in claim 25, further comprising:
   strapping the inactive leg to the substrate.

27. The invention as set forth in claim 15, wherein disposing further comprises:
   disposing the inactive leg over the active leg such that the inactive leg is in contact with the active leg and forms a stacked configuration .

28. The invention as set forth in claim 27, further comprising:
   strapping the stacked configuration to the substrate.

29. A method for fabricating a strain gage comprising:
   a) providing a temporary substrate over a heat sink comprising:
      (1) providing an aluminum comprising member over the heat sink; and
      (2) roughening an exposed surface of the aluminum comprising member;
   b) forming a strain gage element on the exposed surface of the temporary substrate so that the strain gage element is encapsulated by insulative material; and
   c) removing the strain gage element from the temporary substrate.

30. The method of claim 29 wherein providing the temporary substrate comprises providing aluminum tape.

31. The method of claim 30 wherein roughening the exposed surface of the temporary substrate comprises grit blasting the aluminum tape.

32. The method of claim 31 wherein forming the strain gage element on the exposed surface of the temporary substrate comprises forming a base coat of aluminum oxide on the exposed surface.

33. The method of claim 32 wherein forming the strain gage element on the exposed surface of the temporary substrate comprises disposing at least one strain gage wire on the base coat.

34. The method of claim 33 wherein forming the strain gage element on the exposed surface of the temporary substrate comprises encapsulating the at least one strain gage wire in aluminum oxide.

* * * * *